Dec. 10, 1940.   R. R. STITT   2,224,492
POWER CYLINDER FOR FLUID BRAKE SYSTEMS
Original Filed Oct. 30, 1933   2 Sheets-Sheet 1

INVENTOR.
Roscoe R. Stitt
BY
Barnes, Kissell & Laughlin
ATTORNEYS

Patented Dec. 10, 1940

2,224,492

UNITED STATES PATENT OFFICE 2,224,492

POWER CYLINDER FOR FLUID BRAKE SYSTEMS

Roscoe R. Stitt, Detroit, Mich.

Application October 30, 1933, Serial No. 695,868
Renewed September 22, 1939

2 Claims. (Cl. 188—152)

This invention relates to power cylinders for fluid brake systems, and more particularly to power applying structure for vacuum and air brakes.

Heretofore, in the design and operation of power chambers for fluid brakes, much difficulty has been experienced with time lag and power application due to the necessary relatively large fluid displacement. One of the reasons for such structure has been the use of one or more stuffing boxes and in most cases there has been appreciable time interim between the actuation of the brake lever and the application of power.

It is an object of the present invention to completely eliminate the stuffing box in a fluid power chamber and thereby provide a dead end braking chamber or cylinder, requiring comparatively small displacement with resulting immediate action. All sealing diaphragms or similar structures are completely eliminated.

Other features have to do with the design of the cylinder and associated structure, and the manner of mounting and connecting the same into the braking system, as will be more clearly brought out in the specification and claims.

This application is a continuation in part of my application Serial No. 591,826, filed February 9, 1932, now Patent 2,175,510, Oct. 10, 1939.

Figure 1:
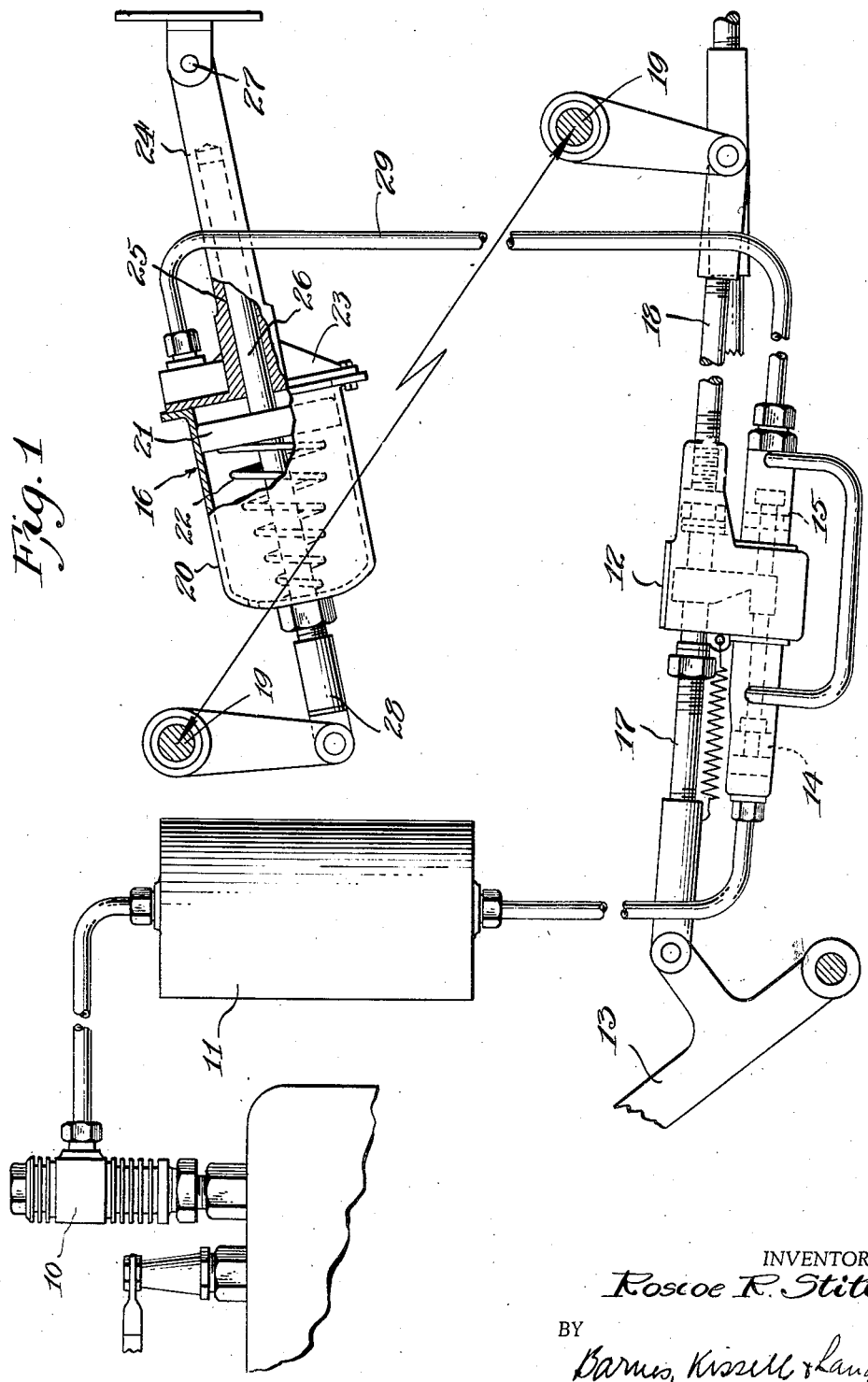
Fig. 1 is a somewhat diagrammatic layout of a fluid pressure braking system including standard follow-up valve structure, and particularly showing my novel power applying cylinder partly cut away.
Figure 2:
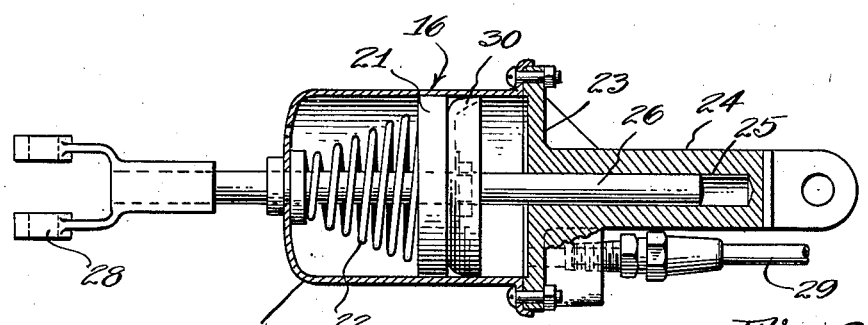
Fig. 2 is a longitudinal sectional view of my novel power cylinder structure.

It will be understood that the power chamber structure forming a part of the present invention may be embodied in connection with substantially any type of fluid brake system and in Fig. 1 I have shown the same as connected into an air brake system of the positive pressure type disclosed in said prior application. In the system illustrated, a standard type of accumulator valve is shown as at 10, which is adapted to feed fluid under pressure into an accumulating tank 11. A follow-up valve 12, controlled by the usual brake pedal 13 is adapted, through the medium of intake and exhaust valves 14 and 15, to control the application and release of air under pressure to and from a power cylinder 16, forming the gist of the present invention. The detailed structure of this valve is more clearly set forth in the above mentioned application No. 591,826.

The valves 14 and 15 are normally held closed when the pedal 13 is in normal released position, and in case of any failure of fluid pressure, a slight movement by the rod 17 will take up the play in the follow-up valve 12 and mechanically apply the brakes through the rod 18 and the brake cross shaft 19. It will be understood that this type of follow-up valve operates fully as a metering valve and with the pedal depressed the desired amount, air released may be effected either partially or fully, as the operator so desires.

The power chamber 16 is provided with a shell normally apertured to the atmosphere and adapted to receive a piston 21. A spring 22 returns the piston 21 to normal postion whenever air pressure is completely relieved after the power stroke. The shell 20 is bolted in air tight relationship to a cylinder head mounting 23, which mounting is provided with an extension 24 apertured as at 25 to receive a piston rod 26 formed integrally with the piston 21.

The cylinder head extension 24 is pivotally mounted to the frame of the vehicle as at 27 and the other end of the piston rod 26 is slidable through the shell 20 and connects to the cross shaft 19 as at 28. It will thus be seen that the cylinder 16 floats between the fixed pivot 27 and the brake actuating lever arm 19.

The extending of the piston rod 26 up a considerable distance into the bearing or aperture 25 formed in the extension 24 and the clamping of the shell 16 to the mounting 23 will completely eliminate the necessity of any stuffing box. Furthermore, the long bearing between the sleeve 25 and piston rod 26 prevents the cylinder from binding in its full extended position.

In Fig. 1 the cylinder is shown with the piston just starting the back stroke, air having been admitted through the supply line 29. A cup expander member 30 furnishes an additional seal to eliminate any low pressure leaks.

By utilizing a dead end braking cylinder, formed by eliminating the stuffing box, in combination with the follow-up type control valve which can be positioned closely adjacent a power member which responds immediately to the applying or releasing of air in the braking system, it will be seen that I have provided a combination which uses a comparatively small air displacement with resulting immediate action. In other words, the piston 26 moves immediately with the introduction of air into the line, while many other systems where a stuffing box is used, it is necessary to fill up a large space before the piston is actuated. Thus the relatively small amount of free air space ahead of the piston and cup assembly at full release position permits piston movement with a small amount of air.

It will thus be seen that the extending of the piston rod 26 into the extension member 24 will eliminate the stuffing box and provide a structure which makes for fast application and quick release of air; and also true alignment of moving parts resulting in a minimum amount of friction.

Figure 3:
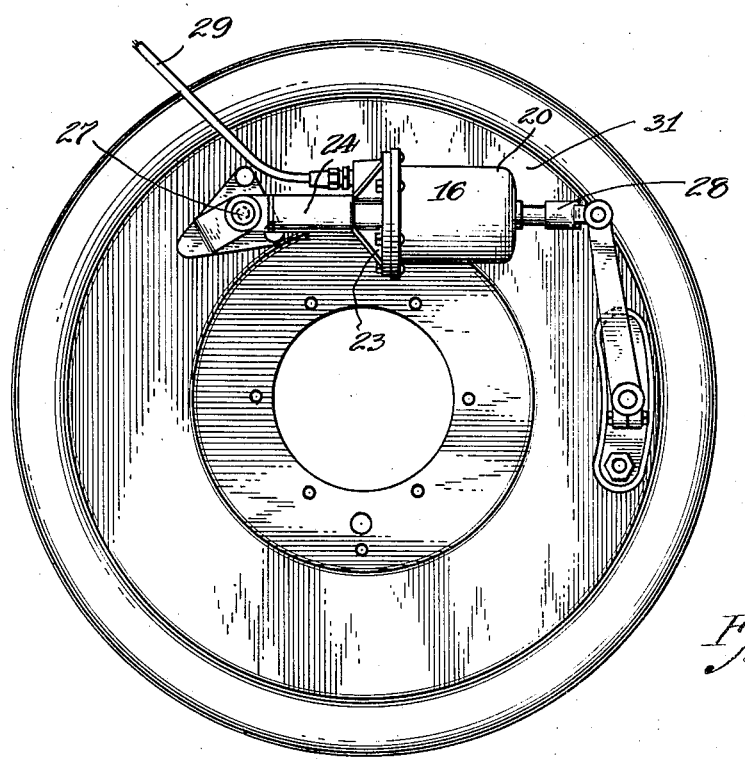
Fig. 3 is an elevation illustrating the manner of mounting my brake cylinder on the braking plate or brake drum.

In the modification illustrated in Fig. 3, the floating dead end braking cylinder is shown mounted directly on a backing plate 31. This mounting of my novel braking structure is important in that it cuts down the space necessary between the backing plate and the vehicle springs. It also requires the attaching of only one bracket member and one clevis; it also reduces the cost of installation and maintenance due to the fact that it becomes unnecessary to employ cross shafts, lever arms, etc. The cylinder floats between the fixed pivot 27 and the brake actuating lever arm, giving a very soft and true braking action and overcoming chatter and lag.

What I claim is:

1. In a brake actuating system for vehicles, of the type having a source of pressure supply and valve control means of the follow-up type connected to brake actuating means, a brake actuating cylinder structure comprising a cylinder head having an extension forming a rigid part thereof and directly and pivotally mounted to a fixed part of the vehicle, a piston movable in said cylinder and having piston rods extending in both directions therefrom, a hollow portion in said extension for receiving one of said piston rods, the other piston rod being slidable through said cylinder, the piston rod extending through said cylinder being connected to the brake actuating means whereby to float said cylinder, a spring normally urging said piston to a position adjacent said cylinder head, and a single conduit connecting the face of the piston adjacent said head with said valve control means whereby actuation of said valve control means admits or releases fluid under pressure to effect immediate movement of said piston.

2. In a brake actuating system for vehicles, of the type having a source of pressure supply, valve control means of the follow-up type connected to brake actuating means, and normally closed admission and release valves for said control means, a cylinder, a head on said cylinder having an extension pivotally mounted to a fixed part of the vehicle, a piston movable in said cylinder and having piston rods extending in both directions therefrom, a hollow portion in said extension for receiving one of said piston rods, the other piston rod being slidable through said cylinder, the piston rod extending through the cylinder being connected to the brake actuating means whereby to float said cylinder, a spring normally urging said piston to a position adjacent said cylinder head, and a single conduit connecting the face of the piston adjacent said head with said valve control means whereby actuation of said valve control means admits or releases fluid under pressure to effect immediate movement of said piston.

ROSCOE R. STITT.